Sept. 25, 1934. K. E. LYMAN 1,974,662
BRAKE DRUM
Filed March 7, 1932
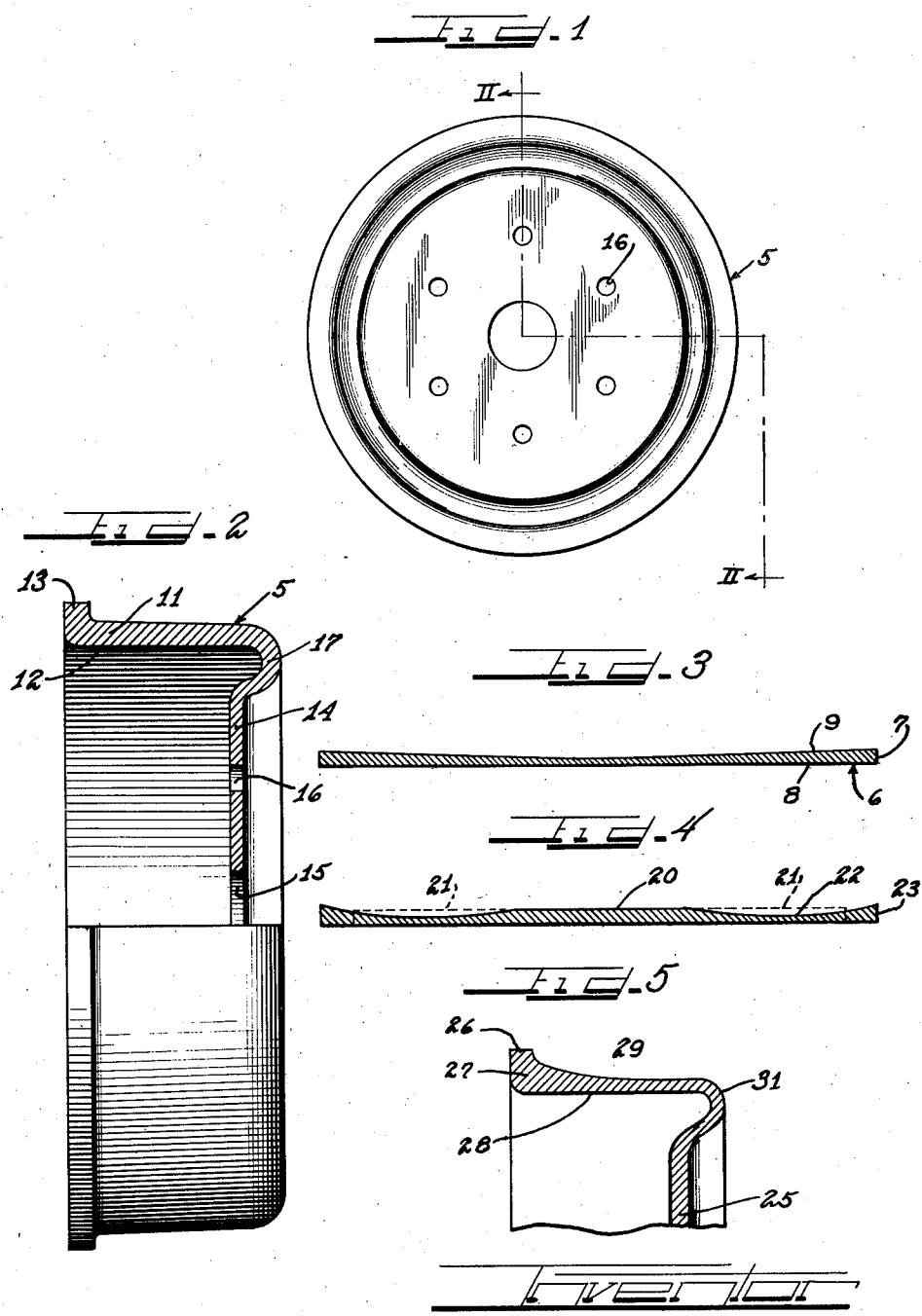
Inventor
Kenneth E. Lyman.
by Charles O. Wells Attys.

Patented Sept. 25, 1934

1,974,662

UNITED STATES PATENT OFFICE 1,974,662

BRAKE DRUM

Kenneth E. Lyman, Chicago, Ill., assignor to Borg-Warner Corporation, Chicago, Ill., a corporation of Illinois Application March 7, 1932, Serial No. 597,174

11 Claims. (Cl. 188—218)

This invention relates to brake drums and will be described as incorporated in a brake drum particularly suitable for use in the braking system of automotive vehicles.

Brake drums of light construction for such uses have heretofore generally been made of stampings from metal blanks or in those instances where heavier drum constructions were required, they were made from castings of the desired shape which were subsequently machined to final form.

The stamped drums heretofore made have been objectionable because of their tendency to warp out of shape when in use and the cast metal drums are objectionable because of the expense of machining the same and because of their excess weight for any given strength.

It is an object of this invention to provide a brake drum which is exceptionally strong, durable and rigid and which is relatively light in weight for a given strength.

A further object of this invention is the provision of such a drum formed from a single rolled or forged disc such that it readily dissipates heat and has provision for expansion to avoid warping when excessively heated by friction.

A further object of this invention is the provision of such a brake drum which overcomes the disadvantages above mentioned and which may be economically manufactured.

Further objects and advantages of this invention will become apparent from the following detailed description thereof with reference to the accompanying drawing.

On the drawing:

Figure 1 is a view in elevation of a brake drum incorporating my invention.

Figure 2 is a side elevational view partly in section taken on the line II—II of Figure 1.

Figure 3 is a diametrical section taken through a rolled or forged malleable metallic disc from which my improved brake drum is constructed.

Figure 4 is a vertical section through a sheet of metal illustrating the method of making a modified form of my invention, and Figure 5 is a vertical section through a fragment of a modification of my invention formed from the sheet metal shown in Figure 4.

As shown on the drawing:

The preferred form of my invention herein illustrated and described consists of a brake drum designated as a whole by numeral 5. It is formed from a malleable steel disc 6 illustrated in section in Figure 3. The disc 6 is preferably tapered from a maximum thickness at the outer diameter 7 toward the center where it is of minimum thickness. The disc 6 being thus formed has its one surface 8 in a single plane and its upper surface 9 is of conical formation having the apex of the cone at the center of the disc. After the disc 6 has been rolled or forged into the shape shown in Figure 3, it is then deformed into the drum 5 having a sectional contour of the form shown in Figure 2. The drum 5 includes a friction portion 11 having an inner surface 12 which forms a substantially perfect cylinder. On the free edge of the friction portion 11 is provided a radially extending stiffening and heat radiating flange 13 for not only preventing distortion of the drum at the free edge when heated and under excess strain, but also aiding in the dissipation of heat to avoid as much as possible excess heating of the drum.

The supporting portion 14 of the drum tapers from the center opening 15, gradually increasing in thickness as the diameter increases. The supporting portion is preferably provided with a plurality of openings 16 through which may be passed suitable securing bolts for clampingly securing the drum to a wheel of a motor vehicle. The friction portion 11 of the drum is integrally united with the supporting portion 14 at one edge by an annular corrugated portion 17 so arranged that when the friction portion 11 is excessively heated, part of the heat will be conducted to the corrugation 17, expanding the same and permitting expansion of the friction portion at the edge where it is joined by the corrugation 17 to the supporting portion 14.

It will be appreciated by those skilled in the art that by this specific construction of brake drum I have provided an exceedingly rigid drum formed of an excellent grade of braking material, and being relatively light for the strength provided. It will also be appreciated that this drum may be economically manufactured by a minimum of rolling and stamping operations.

The modification of my invention illustrated in Figure 5 is formed from a disc 20 originally of uniform thickness at all points, the original condition being illustrated by broken lines 21. In constructing this modification, the marginal portion of the disc 20 is rolled by an outward movement of the rolls to press the metal toward the edge, resulting in making a depression 22 and forcing the metal outwardly into a gradually thickening marginal edge 23. In the final form of the brake drum as illustrated in Figure 5 the central portion of the disc 20 becomes the web 25 and the outer edge 23 of the disc is formed into the radial flange 26 and the thickened edge 27 of the drum. The brake engaging surface of the drum is substantially horizontal as at 28 and the outer surface 29 is curved and the braking portion of the drum is of varying thickness tapering from the peripheral flange 26 to the annular corrugation 31 joining the braking portion with the web 25 and being sufficiently thin to permit expansion of the braking portion as it becomes heated in the manner hereinbefore described with reference to Figure 2.

I am aware that the forms of my invention as herein described are susceptible of numerous variations and modifications without departing from the principle of my invention and I do not desire that the patent to be granted hereon shall be limited to the specific constructions illustrated except as necessitated by the prior art.

I claim as my invention:

1. A brake drum formed of a single disc of malleable metal tapered from a maximum thickness on the outer diameter toward the center.

2. A brake drum formed of a single disc of malleable metal tapered from a maximum thickness on the outer diameter toward the center, and including an annular corrugation adjacent the fixed edge of the drum to provide for expansion and contraction.

3. A brake drum formed of a tapered metallic disc which gradually and uniformly increases in radial thickness from the center to the free edge, said drum including a radially extending flange on the free edge at the zone of maximum thickness.

4. A brake drum formed of a tapered metallic disc which gradually and uniformly increases in thickness from the center to the free edge, said drum including a radially extending flange on the free edge, and looped means forming a yielding connection between the supporting portion of the drum and said friction portion.

5. A brake drum stamped from a single disc of malleable metal and comprising a supporting portion, and a friction portion free at one edge, said friction portion being tapered from a maximum thickness at the free edge toward the supporting part.

6. A brake drum formed of a single disc of malleable metal and comprising a supporting portion, a friction portion free at one edge, said friction portion being tapered from a maximum thickness at the free edge toward the supporting part, and a looped heat radiating part formed integral with said friction portion and connecting it to said supporting portion.

7. A brake drum formed of a single disc of malleable metal, and comprising a supporting portion, a friction portion free at one edge, said drum being uniformly tapered in axial section from a maximum thickness at the free edge of said friction portion to a minimum thickness at the center of the supporting portion, and a looped heat radiating part integral with said friction portion and said supporting portion.

8. A brake drum formed of a single disc of malleable metal, and comprising a supporting portion, a friction portion free at one edge, said drum being uniformly tapered from a maximum thickness at the free edge to a minimum thickness at the center of the supporting portion, and a heat radiating flange formed integrally with the free edge of said friction portion and forming the part of maximum thickness, and an annular looped portion integrally joining said friction portion and said supporting portion to provide for heat expansion of said friction portion relatively to said supporting portion.

9. A brake drum formed of a tapered metallic disc which gradually and uniformly increases in thickness from its center to its perimeter and which disc is dished to provide an attaching web and a brake engaging flange, the flange being integrally connected to the web by a yielding connection of a thickness less than the minimum thickness of the flange, the maximum thickness of said flange being along its free edge.

10. A brake drum comprising a brake engaging flange and an attaching web; the flange and web being connected by a part which is looped in section to provide for heat expansion of said flange with respect to said web; said web, loop and flange being fashioned from a single metallic disc which tapers in thickness increasingly, from its center to its perimeter.

11. A brake drum formed from a single disc of metal and comprising a web or attaching portion and a brake engaging flange, said drum being tapered in axial section from maximum thickness at the free margin of the flange to minimum thickness at the center of the web.

KENNETH E. LYMAN.